United States Patent
Nakajima et al.

[11] Patent Number: 5,357,017
[45] Date of Patent: Oct. 18, 1994

[54] MACROCYCLIC POLY-CONJUGATED SYSTEM AND MACROCYCLIC POLY-CONJUGATED COMPOSITION

[75] Inventors: Keizo Nakajima; Nobuo Sonoda, both of Osaka; Kazuyoshi Tanaka, Uji; Tokio Yamabe, Osaka, all of Japan

[73] Assignee: Matsushita Electric Industrial Co., Ltd., Kadoma, Japan

[21] Appl. No.: 112,977

[22] Filed: Aug. 30, 1993

[30] Foreign Application Priority Data

Aug. 31, 1992 [JP] Japan .................................. 4-230872
Jun. 24, 1993 [JP] Japan .................................. 5-153573

[51] Int. Cl.$^5$ .............................................. C08G 77/08
[52] U.S. Cl. ......................................... 528/15; 528/25; 528/26; 528/28; 528/33; 528/397; 528/395; 526/279
[58] Field of Search ............... 528/15, 25, 33, 395, 528/397, 28, 26; 526/279

[56] References Cited

U.S. PATENT DOCUMENTS

| | | | |
|---|---|---|---|
| 4,886,626 | 12/1989 | Cope et al. | 252/500 |
| 4,900,779 | 2/1990 | Leibfried | 528/25 |
| 4,902,731 | 2/1990 | Leibfried | 528/25 |
| 5,124,375 | 6/1992 | Leibfried | 528/25 |
| 5,124,423 | 6/1992 | Leibfried | 528/25 |

*Primary Examiner*—Melvyn I. Marquis
*Attorney, Agent, or Firm*—Fish & Richardson

[57] ABSTRACT

Highly electrically conductive and stable macrocyclic poly-conjugated systems are provided from a preferred polymer comprising a repetition of cyclic structures each represented by Formula (1):

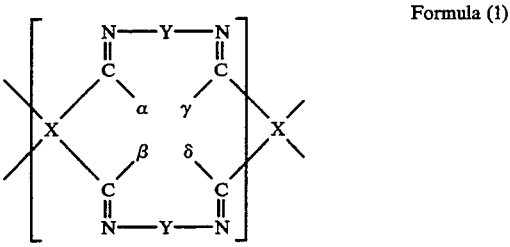

Formula (1)

X and Y each are at least one group selected from the group consisting of a C—C unsaturated bonding group, a C—N unsaturated bonding group, an N—N unsaturated bonding group, an Si—Si bonding group and at least one group selected from the group consisting of an aromatic ring, a heterocyclic ring and their derivatives. $\alpha$, $\beta$, $\gamma$, and $\delta$, when they do not form a closed ring with X, are each at least one group selected from the group consisting of a hydrogen atom, a $C_{1-5}$ lower alkyl group, an —$NH_2$ group, and an —$NR_2$ group in which R is a $C_{1-5}$ lower alkyl group. When $\alpha$, $\beta$, $\gamma$, and $\delta$ form a closed ring with X, ($\alpha$ and $\beta$) or ($\gamma$ and $\delta$) together jointly represent

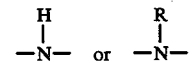

in which R is a $C_{1-5}$ lower alkyl group.

7 Claims, 1 Drawing Sheet

MACROCYCLIC POLY-CONJUGATED SYSTEM AND MACROCYCLIC POLY-CONJUGATED COMPOSITION

FIELD OF THE INVENTION

This invention relates to a macrocyclic poly-conjugated system and a macrocyclic poly-conjugated composition, both of which are for use as an electronic material.

BACKGROUND OF THE INVENTION

Conducting polymers have recently attracted much attention because they are flexible, easy to process and very useful in reducing the size of a variety of electronic instruments.

Many kinds of the conducting polymer are heretofore known; typically, polyacetylene, polythiophene, polypyrrole, poly-p-phenylene or their derivatives, each of which has a one-dimensional $\pi$ conjugation spreading like a chain. On the other hand, polyacene has a two-dimensional $\pi$ conjugation spreading like a ladder. Conductivity values of these polymers after being doped are on the order of $10^{-5}$ to $10^{-3}$ S/cm.

Application of the polymers, however, was greatly restricted for the following reasons.

Polyacetylene, which is generally unstable in an oxygen-containing environment, is readily oxidized. Although aromatic polymers such as polythiophene, polypyrrole or poly-p-phenylene are stable in air, they and their doped conducting polymers are not as conductive as metal. This is because their energy band gap (Eg) before being doped is large compared to that of polyacetylene. The ladder-like polymers such as polyacene also have disadvantages; they are less soluble, and, in turn, hard to process into a desired shape and thus difficult to control when constructing products.

Polymers like polyacetylene, polythiophene, polypyrrole, poly-p-phenylene and their derivatives and polyacene, and polymer-based compositions thus have had great restrictions for practical use, since they are poor in conductivity, solubility and stability in air.

The invention provides a highly conductive and stable polymer and a polymer-based composition containing the polymer as a principal component.

SUMMARY OF THE INVENTION

A first feature of the invention is a macrocyclic poly-conjugated system comprising a polymeric principal chain containing a conjugated cyclic structure with at least seven atoms, and rings adjacent to each other coupled by sharing a conjugated group or by a conjugated bond.

It is preferable in the invention that a conjugated bond at each coupling site of the conjugated cyclic structure and the rings is at least one bond selected from the group consisting of C—C unsaturated bond, C—N unsaturated bond, N—N unsaturated bond, $\sigma$ conjugated bond of Si—Si and $\pi$ conjugated bond of at least one group selected from an aromatic ring, a heterocyclic ring and their derivatives.

It is preferable in the invention that the polymeric principal chain comprises a repetition of cyclic structures each represented by the following Formula (1):

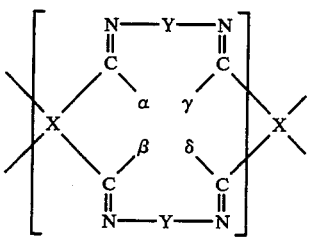

Formula (1)

wherein X and Y each are at least one group selected from the group consisting of a C—C unsaturated bonding group, a C—N unsaturated bonding group, an N—N unsaturated bonding group, an Si—Si bonding group and at least one group selected from an aromatic ring, a heterocyclic ring and their derivative, and $\alpha$, $\beta$, $\gamma$, and $\delta$ each are at least one group selected from the group consisting of a hydrogen atom, a $C_{1-5}$ lower alkyl group, an —NH$_2$ group, an —NR$_2$ group, wherein R is a $C_{1-5}$ lower alkyl group, an >NH or >NR group consisting of $\alpha$ and $\beta$, wherein R is a $C_{1-5}$ lower alkyl group, and an >NH or >NR group consisting of $\gamma$ and $\delta$, wherein R is a $C_{1-5}$ lower alkyl group.

It is also preferable in the invention that the polymeric principal chain comprises a repetition of cyclic structures each represented by the following Formula (2):

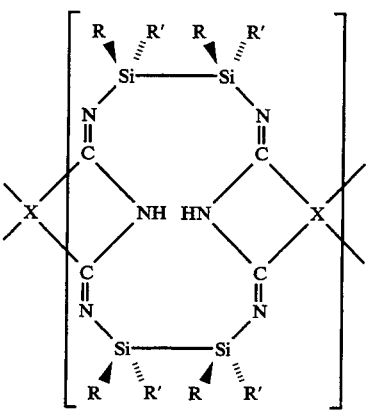

Formula (2)

wherein X is at least one group selected from the group consisting of a C—C unsaturated bonding group, a C—N unsaturated bonding group, an N—N unsaturated bonding group and at least one group selected from an aromatic ring, a heterocyclic ring and their derivatives, and R and R' each are a $C_{1-8}$ alkyl group or a phenyl group.

It is further preferable in the invention that the polymeric principal chain comprises a repetition of cyclic structures each represented by the following Formula (3):

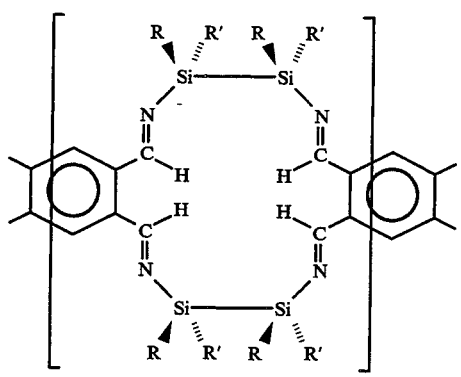

Formula (3)

wherein R and R' each are a $C_{1-8}$ alkyl group or a phenyl group.

A second feature of the invention is a macrocyclic poly-conjugated composition comprising as a principal component a macrocyclic poly-conjugated system of the invention as described above and a dopant.

It is preferable in the invention that the dopant comprises at least one ion selected from the group consisting of an iodine ion, a fluorine ion, a bromine ion and an arsenic ion.

The term "conducting polymer" in this application refers a polymer with highly advanced conjugation. This polymer usually has an energy band gap (Eg), and it is semi-conductive and insulating. In the molecular design for a better electrically conducting polymeric material, the following conditions are needed:

(i) The energy band gap (Eg) is narrow; and
(ii) The band width in the vicinity of the frontier orbital (the widths of valence band VB and conduction band CB) is wide; that is, the conjugation is spreading all over the principal chain of the material.

For reference, as a simple model, three macrocyclic poly-conjugated systems each including a repetition of cyclic structures of the following Formulas (4), (5) or (6), were theoretically analyzed by a quantum chemical methodology, the molecular orbital method.

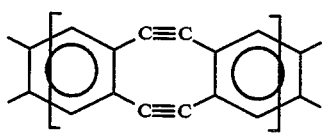

Formula (4)

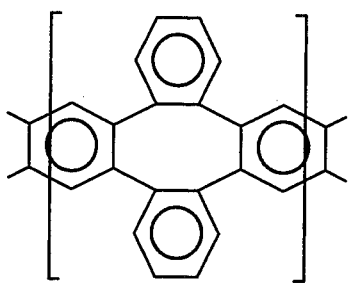

Formula (5)

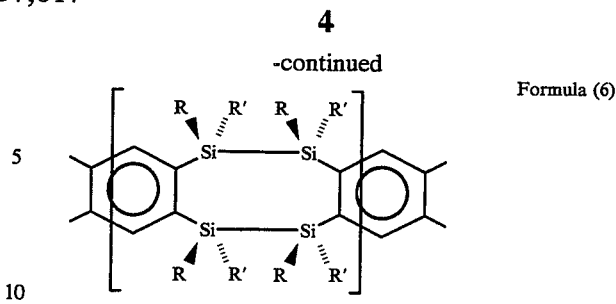

Formula (6)

wherein R and R' each are a $C_{1-8}$ alkyl group or a phenyl group.

The analysis made it clear that these polymers exhibited a narrower Eg compared to that of polyacetylene, and the band width in the vicinity of the frontier orbital (the widths of VB and CB) was wide.

Similarly, other two polymers each including a repetition of cyclic structures of the following Formulas (7) or (8), were analyzed as a model of the macrocyclic poly-conjugated system including a repetition of the cyclic structures of Formula (1).

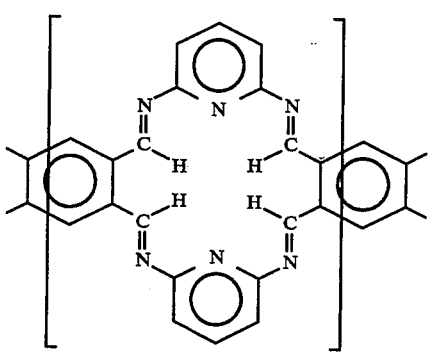

Formula (7)

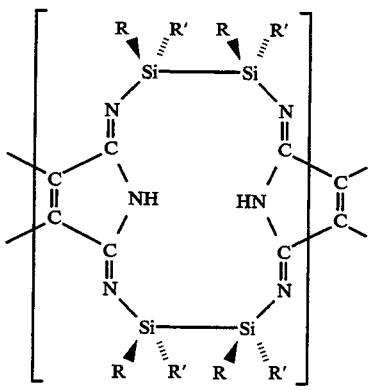

Formula (8)

wherein R and R' each are a $C_{1-8}$ alkyl group or a phenyl group.

The analysis made it clear that both polymers also exhibited a narrower Eg than that of polyacetylene, and that the band width in the vicinity of the frontier orbital (the widths of VB and CB) was wide.

As stated above, the conjugation all over the cyclic structures of a polymer reduces Eg and widens a band in the vicinity of the frontier orbital, resulting in a desirably large degree of electric conductivity. This is because the conjugation spreads in the whole of the polymer.

The macrocyclic poly-conjugated system of the invention is structurally stable and unaffected by environmental factors such as light, heat or air, as compared to conventional poly-conjugated systems, e.g., polyacetylene, in which the π conjugation spreads in the molecule like a chain. The reason is that the conjugation spreads all over the polymer not only like a chain but also like a ring.

In further comparison with polythiophene, polypyrrole, poly-p-phenylene and their derivatives, the macrocyclic poly-conjugated system of the invention has a narrow Eg due to the sufficient orbital interaction. Consequently, it is more conductive than those polymers.

Moreover, the macrocyclic poly-conjugated system of the invention is superior to a rudder-like polymer such as polyacene in solubility and structural control, since its conjugated cyclic structure is larger.

The macrocyclic poly-conjugated systems which include an Si—Si bonding groups, in particular, the groups of Formulas (2), (3), (6) or (8), have excellent solubility.

The macrocyclic poly-conjugated composition which comprises as a principal component the above poly-conjugated system and a dopant is very conductive because it incorporates an ionic substance such as iodine ions.

DETAILED DESCRIPTION OF THE INVENTION

Figure 1:
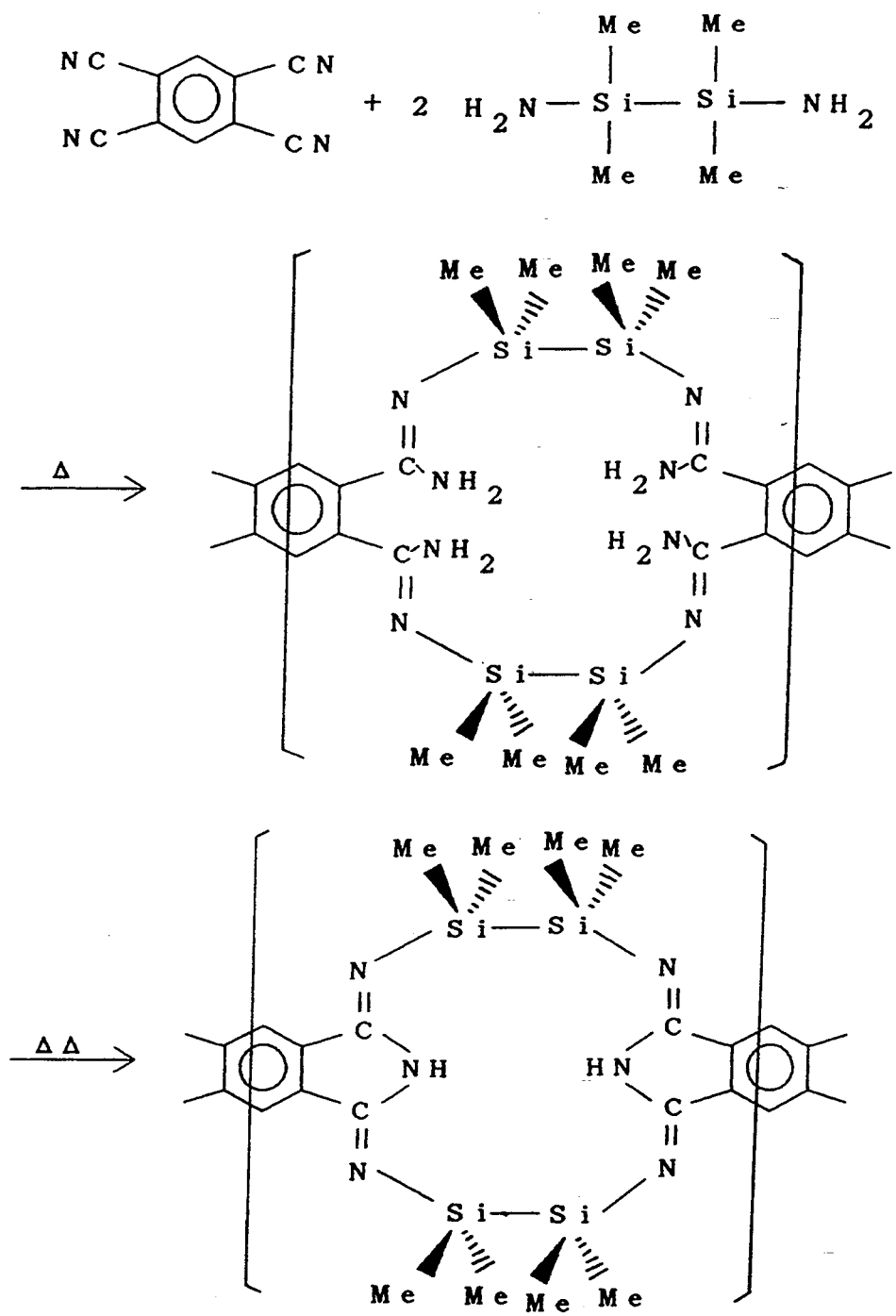
FIG. 1 is a reaction formula of the reactions taking place in Example 6 of the invention.

As an aromatic ring or a heterocyclic rings a 5- or 6-membered aromatic ring or a 5- or 6-membered heterocyclic ring is preferably used in the preferred embodiments of the invention, for example, benzene ring, pyridine ring or thiophene ring.

If necessary, the macrocyclic poly-conjugated system of the invention can be used in combination with a general-purpose insulating polymer such as polystyrene or polycarbonate. This macrocyclic polymer-based composition is also highly stable. Further, the composition doped with an ionic substance is useful as well.

As a dopant, in addition to an iodine ion, a halogen ion like fluorine or bromine and an arsenic ion can be used. The dose for doping is preferably about 1 to 40 mol % per unit of the poly-conjugated system. A doped polymer-based composition is prepared by exposing a polymer of the invention to an atmosphere of the dopant.

The preferred embodiments of the invention will hereinafter be explained with reference to the following Examples. It should, however, be understood that the embodiments are not intended to limit the full scope of the invention. Like polymers or compositions can be provided from any alternative reaction paths.

EXAMPLE 1

A 3-liter three-forked flask with a gas tube and a thermometer, containing a magnetic stirrer therein, was well dried with $N_2$ gas. After complete drying, we poured a 1-liter solution of ethylmagnesium bromide (about 1 mol/l) in tetrahydrofuran, and 1.5-liter tetrahydrofuran (hereinafter referred to as THF) and heated the mixture to 50° C. This THF had been provided by distillation from a mixture of THF and $LiAlH_4$. Then, we injected acetylene gas into the reaction mixture at a rate of 300 to 400 ml/min while vigorously stirring. When the flask was cooled to 40° C. after stopping the heat treatment, the flow of acetylene gas was also stopped. In return, we injected $N_2$ gas and heated the flask at 50° C. for 30 min to provide a precipitate, dimagnesium acetylene dibromide.

To the precipitate were added dropwise 500 ml of a solution of 1,2,4,5-tetrabromobenzene (197 g, 0.5 mol) and 2,2'-bipyridyldichloronickel ($NiCl_2(bpy)$, 54 g) in THF. This mixture was stirred at 50° to 60° C. for 2 hours. After the THF was distilled off, the residue was added to dimethylformamide (hereinafter referred to as DMF) and subjected to silica gel chromatography. The isolated substance was recrystallized from a solution of DMF/hexane to give a purified product.

The product was analyzed by element analysis, infrared absorption (IR) spectrum, nuclear magnetic resonance (NMR) and gel permeation chromatography. The results are as follows:

Element analysis C: 97.9%, H: 1.6% (theoretical C: 98.3%, H: 1.7%) IR: 3060–3000 $cm^{-1}$ (aromatic C—H) 2100 $cm^{-1}$ (C≡C) 1590, 1480 $cm^{-1}$ (C=C) NMR: 7.6 ppm GPC: (eluent: DMF, on a poly(ethylene glycol) basis) MW=100,000

The above results identified the product as a polymer composed of the groups of Formula (4).

The polymer dissolved in DMF was applied over a glass substrate to form a film of about 4 μm thickness. A four-point probe method measured the electric conductivity of the film before and after doping as $4.7 \times 10^{-4}$ S/cm and 31.0 S/cm, respectively. The doping was carried out by exposing the film to $AsF_5$ atmosphere at room temperature under reduced pressure ($10^{-2}$ mmHg) for 30 min.

EXAMPLE 2

A 3-liter four-forked flask with a gas tube, a reflux condenser and a thermometer, containing a magnetic stirrer therein, was well dried with $N_2$ gas. After complete drying, we put into the flask magnesium (97.2 g, 4.0 mol) and 1.5-liter of THF distilled from a mixture of THF and $LiAlH_4$. Then, we added dropwise a 500 ml solution of 1,2,4,5-tetrabromobenzene (393.7 g, 1.0 mol) in THF and stirred the mixture at a temperature of 50° to 60° C. for 2 hours. To the resulting Grignard reagent was added 400 ml of a solution of o-dichlorobenzene (294 g, 2.0 mol) and $LiCuCl_4$ (41 g) in THF. The reaction mixture was refluxed for 4 hours. After the THF was distilled off, the residue was added to DMF and subjected to silica gel chromatography. The isolated substance was recrystallized from a solution of DMF/hexane to give a purified product, which was similarly analyzed. Here are presented the results.

Element analysis C: 95.2%, H: 4.2% (theoretical C: 95.5%, H: 4.5%) IR: 3040–3000 $cm^{-1}$ ( aromatic C—H ) 1590, 1480 $cm^{-1}$ (C=C) NMR: 8.2–8.4 ppm (s,2H), 7.8–7.6 ppm (m,4H), 7.4–7.1 ppm (m,4H) GPC: (eluent: DMF, on a poly(ethylene glycol) basis) MW=150,000

The above results identified the product as a polymer composed of the groups of Formula (5).

The polymer dissolved in DMF was applied over a glass substrate to form a film of about 5 μm thickness. A four-point probe method measured the electric conductivity of the film before and after $AsF_5$ doping as $3.9 \times 10^{-5}$ S/cm and 86.0 S/cm, respectively. The doping was carried out in the same manner as in Example 1.

EXAMPLE 3

A 500 ml four-forked flask with a gas tube, a reflux condenser and a thermometer, containing a magnetic stirrer therein, was well dried with $N_2$ gas. After complete drying, we put into the flask magnesium (9.7 g, 0.4 mol) and 150 ml of THF distilled from a mixture of THF and LiAlH$_4$. Then, we added dropwise 50 ml of a solution of 1,2,4,5-tetrabromobenzene (39.4 g, 0.1 mol) in THF and stirred the mixture at a temperature of 50° to 60° C. for 2 hours. To the resulting Grignard reagent was added 40 ml of a solution of 1,2-dichlorotetramethyldisilane (38 g, 0.2 mol) and LiCuCl$_4$ (3.8 g) in THF. The reaction mixture was refluxed for 4 hours. After the THF was distilled off, the residue was added to DMF and subjected to silica gel chromatography. The isolated substance was recrystallized from a solution of DMF/hexane to give a purified product, which was similarly analyzed. Here are presented the results.

Element analysis C: 55.2%, H: 8.2% (theoretical C: 54.8%, H: 8.5%, Si: 36.6%) IR: 3040–3000 cm$^{-1}$ (aromatic C—H), 1590, 1480 cm$^{-1}$ (C=C) NMR: 7.8 ppm (s,2H), 0.4–0.0 ppm (m,24H) GPC: (eluent: DMF, on a poly(ethylene glycol) basis) MW=250,000

The above results identified the product as a polymer composed of the groups of Formula (6) where R and R' each are a methyl group.

The polymer dissolved in DMF was applied over a glass substrate to form a film of about 4 μm thickness. A four-point probe method measured the electric conductivity of the film before and after AsF$_5$ doping as $6.7 \times 10^{-3}$ S/cm and 92.0 S/cm, respectively. The doping was carried out in the same manner as in Example 1.

EXAMPLE 4

A 1-liter three-forked flask with a gas tube, a reflux condenser and a thermometer, containing a magnetic stirrer therein was well dried with N$_2$ gas. We poured in 500 ml of a solution of 1,2,4,5-tetramethylbenzene (25.0 g, 0.19 mol) in carbon tetrachloride and heated the mixture to a reflux temperature while stirring. After the mixture was heated to that temperature, bromine (80 ml, 3.2 mol) was added dropwise under a mercury lamp. After the addition of bromine, the reaction was irradiated under the mercury lamp more three days. The resulting white precipitate was filtered, and 60 g of it was added to morpholine (400 ml, 4.6 mol) in a 1-liter three-forked flask containing N$_2$ gas, which was stirred at room temperature for 3 days. The resulting precipitate was filtered, stirred in ice water for 3 hours and recovered. Further, we added the recovered precipitate (5.2 g) to a solution of nearly −100° C. boiling water (10 ml) and concentrated hydrochloric acid (10 ml) in a beaker and stirred for about 20 seconds immediately before adding Na$_2$SO$_4$.10H$_2$O (25 g, 80 mmol). This mixture was filtered and extracted with ethyl acetate to remove the solvent for providing 1,2,4,5-tetraformylbenzene.

A solution (500 ml) of 1,2,4,5-tetraformylbenzene (38.0 g, 0.2 mol) and 2,6-diaminopyridine (43.6 g, 0.4 mol) in DMF was poured into a dried 1-liter three-forked flask with a gas tube, a reflux condenser and a thermometer, containing a magnetic stirrer therein, and it was heated at 100° C. for 12 hours in a nitrogen atmosphere while stirring. After the DMF was removed, the residue was added again to DMF and subjected to silica gel chromatography. The isolated substance was recrystallized from a solution of DMF/hexane to give a purified product, which was similarly analyzed. Here are presented the results.

Element analysis C: 71.9%, H: 3.5%, N: 24.5% (theoretical C: 71.4%, H: 3.6%, N: 25.0%) IR: 3200 cm$^{-1}$ (—N=CH) 3040–3000 cm$^{-1}$ (aromatic C—H), 1630 cm$^{-1}$ (C=N), 1590, 1480 cm$^{-1}$ (C=C) NMR: 9.2 ppm (s,4H), 7.9 ppm (s,2H), 7.5–7.2 ppm (m,6H) GPC: (eluent: DMF, on a poly(ethylene glycol) basis) MW=400,000

The above results identified the product as a polymer composed of the groups of Formula (7).

The polymer dissolved in DMF was applied over a glass substrate to form a film of about 4.5 μm thickness. A four-point probe method measured the electric conductivity of the film before and after AsF$_5$ doping as $2.4 \times 10^{-3}$ S/cm and 320.0 S/cm, respectively. The doping was carried out in the same manner as in Example 1.

EXAMPLE 5

A 1-liter three-forked flask with a gas tube, a reflux condenser and a thermometer, containing a magnetic stirrer therein, was dried. A 300 ml solution of tetracyanoethylene (12.8 g, 0.1 mol) and 1,2-diaminotetramethyldisilane (29.7 g, 0.2 mol) in N-methyl-2-pyrrolidone (hereinafter referred to as NMP) was poured into the flask and heated at 130° C. for 12 hours, at 180° C. for 12 hours and at a reflux temperature for 12 hours while stirring. Afterwards, the resultant product was recrystallized from a solution of NMP/hexane to give a purified product, which was similarly analyzed. Here are presented the results.

Element analysis C: 43.4%, H: 6.5%, N: 21.8% (theoretical C: 43.0%, H: 6.7%, N: 21.5%, Si: 28.8%) IR: (2200 cm$^{-1}$ (N≡C) had disappeared.) 1620 cm$^{-1}$ (C=N), 1590, 1480 cm$^{-1}$ (C=C) NMR: 2.1 ppm (s,2H), 0.2 ppm (m,24H) GPC: (eluent: DMF, on a poly(ethylene glycol) basis) MW=500,000

The above results identified the product as a polymer composed of the groups of Formula (8) where R and R' each are a methyl group. In this case, Formula (8) is the same as Formula (2) where X designates C=C.

The polymer dissolved in NMP was applied over a glass substrate to form a film of about 4 μm thickness. A four-point probe method measured the electric conductivity of the film before and after AsF$_5$ doping as $5.5 \times 10^{-3}$ S/cm and 240.0 S/cm, respectively. The doping was carried out in the same manner as in Example 1.

EXAMPLE 6

A 1-liter three-forked flask with a gas tube, a reflux condenser and a thermometer, with a magnetic stirrer therein, was dried. A 300 ml solution of 1,2,4,5-tetracyanobenzene (17.8 g, 0.1 mol) and 1,2-diaminotetramethyldisilane (29.7 g, 0.2 mol) in NMP was poured into the flask and heated at 130° C. for 12 hours, at 180° C. for 10 hours and at a reflux temperature for 12 hours while stirring. Afterwards, the resultant product was recrystallized from a solution of NMP/acetone to give a purified product. FIG. 1 is a reaction scheme for this process, wherein Me denotes a methyl group.

The product was similarly analyzed. Here are presented the results.

Element analysis C: 49.6%, H: 5.9%, N: 19.5% (theoretical C: 49.1%, H: 6.4%, N: 19.1%, Si: 25.5%) IR: 3040–3000 cm$^{-1}$ (aromatic C—H), (2200 cm$^{-1}$ (N≡C) had disappeared.) 1620 cm$^{-1}$ (C=N), 1590, 1480 cm$^{-1}$ (C=C) NMR: 7.4–7.2 ppm (s,2H), 2.1 ppm (s,2H), 0.2 ppm (m,24H) GPC: (eluent: DMF, on a poly(ethylene glycol) basis) MW=450,000

The above results identified the product as a polymer composed of the groups of Formula (2) where X denotes a four-substituted benzene, and R and R' each are a methyl group.

The polymer dissolved in NMP was applied over a glass substrate to form a film of about 4 μm thickness. A four-point probe method measured the electric conductivity of the film before and after $AsF_5$ doping as $1.5 \times 10^{-3}$ S/cm and 190.0 S/cm, respectively. The doping was carried out in the same manner as in Example 1.

EXAMPLE 7

A 1-liter three-forked flask with a gas tube, a reflux condenser, a thermometer and a magnetic stirrer therein, was dried. A 300 ml solution of 1,2,4,5-tetraformylbenzene provided in Example 4 (19.0 g, 0.1 mol) and 1,2-diaminotetramethyldisilane (29.7 g, 0.2 mol) in NMP was poured into the flask and stirred at 120° C. for 12 hours in a nitrogen atmosphere. Afterwards, the resultant product was recrystallized from a solution of NMP/acetone to give a purified product, which was similarly analyzed. Here are presented the results.

Element analysis C: 52.3%, H: 7.0%, N: 13.9% (theoretical C: 52.1%, H: 7.3%, N: 13.5%, Si: 27.1%) IR: 3040-3000 cm$^{-1}$ (aromatic C—H), 1620 cm$^{-1}$ (C=N), 1590, 1480 cm$^{-1}$ (C=C) NMR: 7.4-7.2 ppm (s,2H), 4.1 ppm (s,4H), 0.2 ppm (m,24H) GPC: (eluent: DMF, on a poly(ethylene glycol) basis) MW=550,000

The above results identified the product as a polymer composed of the groups of Formula (3) where R and R' each are a methyl group.

The polymer dissolved in NMP was applied over a glass substrate to form a film of about 4 μm thickness. A four-point probe method measured the electric conductivity of the film before and after $AsF_5$ doping as $8.5 \times 10^{-3}$ S/cm and 490.0 S/cm, respectively. The doping was carried out in the same manner as in Example 1.

As described above, the preferred embodiments readily provided highly conductive and stable macrocyclic poly-conjugated systems. The preferred macrocyclic poly-conjugated systems each including the groups of Formulas (2) or (3) had excellent solubility. The doped macrocyclic poly-conjugated compositions were more conductive.

What is claimed is:

1. A macrocyclic poly-conjugated system comprising a polymeric principal chain containing a conjugated cyclic structure of at least seven atoms, and rings adjacent to each other coupled at coupling sites by sharing a conjugated group or by a conjugated bond.

2. A macrocyclic poly-conjugated system of claim 1 wherein the conjugated bond is at least one bond selected from the group consisting of a C—C unsaturated bond, a C—N unsaturated bond, an N—N unsaturated bond, a σ conjugated bond of Si—Si and a π conjugated bond comprising at least one group selected from the group consisting of an aromatic ring, a heterocyclic ring and derivatives thereof.

3. A macrocyclic poly-conjugated system of claim 1 wherein said polymeric principal chain comprises a repetition of cyclic structures each represented by the following Formula (A):

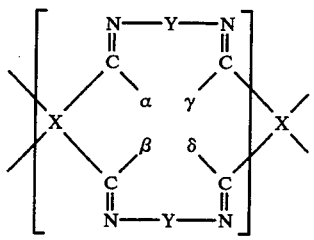

Formula (A)

wherein X and Y each are at least one group selected from the group consisting of a C—C unsaturated bonding group, a C—N unsaturated bonding group, an N—N unsaturated bonding group, an Si—Si bonding group and at least one group selected from the group consisting of an aromatic ring, a heterocyclic ring and derivatives thereof; and wherein α, β, γ and δ, when they do not form a closed ring with X, are each at least one group selected from the group consisting of a hydrogen atom, a $C_{1-5}$ lower alkyl group, an —$NH_2$ group, and an —$NR_2$ group in which R is a $C_{1-5}$ lower alkyl group, and when they form a closed ring with X, (α and β) or (γ and δ) together jointly represent

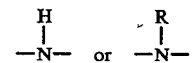

in which R is a $C_{1-5}$ lower alkyl group.

4. A macrocyclic poly-conjugated system of claim 1 wherein said polymeric principal chain comprises a repetition of cyclic structures each represented by the following Formula (B):

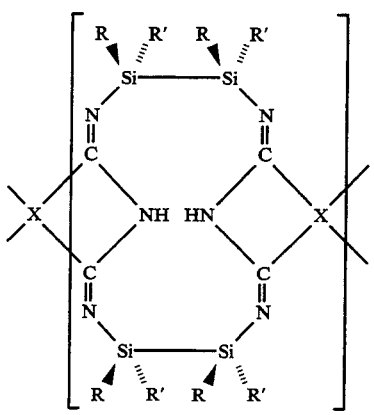

Formula (B)

wherein X is at least one group selected from the group consisting of a C—C unsaturated bonding group, a C—N unsaturated bonding group, an N—N unsaturated bonding group and at least one group selected from the group consisting of an aromatic ring, a heterocyclic ring and derivatives thereof, and R and R' each are a $C_{1-8}$ alkyl group or a phenyl group.

5. A macrocyclic poly-conjugated system of claim 1 wherein said polymeric principal chain comprises a repetition of cyclic structures each represented by the following Formula (C):

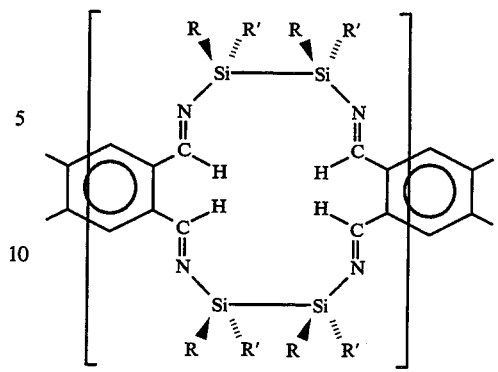

Formula (C)

wherein R and R' each are a $C_{1-8}$ alkyl group or a phenyl group.

6. A macrocyclic poly-conjugated composition comprising the macrocyclic poly-conjugated system of any one of claims 1, 2, 3, 4 or 5 and a dopant.

7. A macrocyclic poly-conjugated composition of claim 6, wherein said dopant comprises at least one ion selected from the group consisting of an iodine ion, a fluorine ion, a bromine ion and an arsenic ion.

* * * * *